(12) United States Patent
Ding et al.

(10) Patent No.: US 8,719,452 B1
(45) Date of Patent: May 6, 2014

(54) CORRECTION OF CLIENT-ASSIGNED TIMESTAMPS

(75) Inventors: Zhongli Ding, Mountain View, CA (US); Dragan Zivkovic, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 185 days.

(21) Appl. No.: 13/194,892

(22) Filed: Jul. 29, 2011

(51) Int. Cl.
*G06F 15/16* (2006.01)

(52) U.S. Cl.
USPC ......................................................... 709/248

(58) Field of Classification Search
USPC ......................................................... 709/248
See application file for complete search history.

(56) References Cited

U.S. PATENT DOCUMENTS

| | | | |
|---|---|---|---|
| 6,327,274 B1 | 12/2001 | Ravikanth | 370/516 |
| 7,023,884 B2 | 4/2006 | Chuah et al. | 370/507 |
| 7,609,207 B2 | 10/2009 | Lyons | 342/387 |
| 7,702,909 B2 * | 4/2010 | Vainstein | 713/178 |
| 7,969,891 B2 | 6/2011 | Krober et al. | 370/241 |
| 8,059,688 B2 | 11/2011 | Stanton et al. | 370/503 |
| 2009/0210784 A1 * | 8/2009 | Sullivan et al. | 715/238 |
| 2010/0057939 A1 * | 3/2010 | Zhang et al. | 709/248 |

* cited by examiner

*Primary Examiner* — Jason Gee
(74) *Attorney, Agent, or Firm* — Fish & Richardson P.C.

(57) ABSTRACT

Methods, systems, and apparatus, including computer programs encoded on a computer storage medium, for correcting client-assigned timestamps. In one aspect, a method includes receiving, by one or more servers, a data packet that includes (i) data referencing one or more client-side events, (ii) data referencing a respective time that a client has assigned to each event, and (iii) data referencing a transmission time that the client has assigned to the data packet. The method also includes assigning, by the one or more servers, a receipt time to the data packet, and comparing, by the one or more servers, the transmission time that the client has assigned to the data packet to the receipt time that the one or more servers have assigned to the data packet, to determine a time correction factor.

15 Claims, 4 Drawing Sheets

CORRECTION OF CLIENT-ASSIGNED TIMESTAMPS

BACKGROUND

The present specification relates to client-server communications.

A client-server model of computing defines some computer resources as a server, and other computer resources as clients. Computing tasks are partitions, with some tasks carried out by the client, and some tasks carried out by the server. A single server may provide services to many clients, and a single client may access many resources by communicating with many servers. In some implementations, a single computer device may host both a server and one or more attached clients. In some other implementations, each client and each server may be associated with one, or a group of, separate computers.

SUMMARY

A server may receive messages from one or more clients that are not synchronized with the server's clocks. These messages may be associated with time data that is accurate according to their respective client's clocks, but inaccurate according to the server's clock. According to one innovative aspect of the subject matter described in this specification, to correct this inaccuracy, the server may compare client-supplied transmission time data with server-supplied reception time data. The difference between the transmission time data and the reception data, after accounting for latencies, may be used to identify the difference between a server's and client's clocks. This difference may be used to modify time data from the client so that that time data is accurate from the server's perspective.

According to another innovative aspect of the subject matter described in this specification, data that (i) has been assigned timestamps by a client and (ii) has been communicated from the client device to a server, may be assigned corrected timestamps by the server, and may be stored at the server according to the corrected timestamps. Correcting a client-assigned timestamp may include comparing a client-assigned transmission time associated with the data to a server-assigned receipt time associated with the data, calculating a correction factor based on the comparison, and applying the correction factor to the client-assigned timestamp.

According to another innovative aspect of the subject matter described in this specification, a method includes receiving, by one or more servers, a data packet that includes data referencing one or more client-side events, data referencing a respective time that a client has assigned to each event, and data referencing a transmission time that the client has assigned to the data packet. The method includes assigning, by the one or more servers, a receipt time to the data packet, and comparing, by the one or more servers, the transmission time that the client has assigned to the data packet to the receipt time that the one or more servers have assigned to the data packet, to determine a time correction factor. The method also includes applying, by the one or more servers, the time correction factor to the respective time that the client has assigned to each client-side events, to generate a respective corrected time for each event, and logging, by the one or more servers, the one or more client-side events in an event log according to the respective corrected time for each event.

Other embodiments of these aspects include corresponding systems, apparatus, and computer programs, configured to perform the actions of the methods, encoded on computer storage devices.

These and other embodiments may each optionally include one or more of the following features. For instance, the method includes determining, as the receipt time, a time when the data packet was received by the one or more servers; the method includes determining a latency factor associated with communicating the data packet, where applying the time correction factor to generate a respective corrected time for each event further includes applying the latency factor; each event is a click event a corrected time for a particular event satisfies $\text{SERVEREVENTTIME} = \text{CLIENTEVENTTIME} - (\text{CLIENTPINGTIME} - \text{SERVERPINGTIME})$, where SERVEREVENTTIME represents the corrected time for the particular event, CLIENTEVENTTIME represents the time that the client has assigned to the particular event, CLIENTPINGTIME represents the transmission time that the client has assigned to the data packet, and SERVERPINGTIME represents the receipt time assigned to the data packet by the one or more servers; the data packet comprises a ping request; the respective times that the client has assigned to the client-side events represent absolute times as determined by the client, and the respective corrected times generated by the one or more servers represent absolute times as determined by the server; and/or the corrected time for a particular event is determined based on values for SERVEREVENTTIME, CLIENTEVENTTIME, CLIENTPINGTIME value, and SERVERPINGTIME.

Advantageous implementations may include one or more of the following features. Client computers may report records of client-side events to a server without synchronizing with the server's clock, or with a reference clock. Client computers may communicate with two different servers whose clocks are not synchronized with each other, or whose clocks are associated with different time zones. Client-side events from many clients may be aggregated by a server and stored in an accurate, chronological order.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
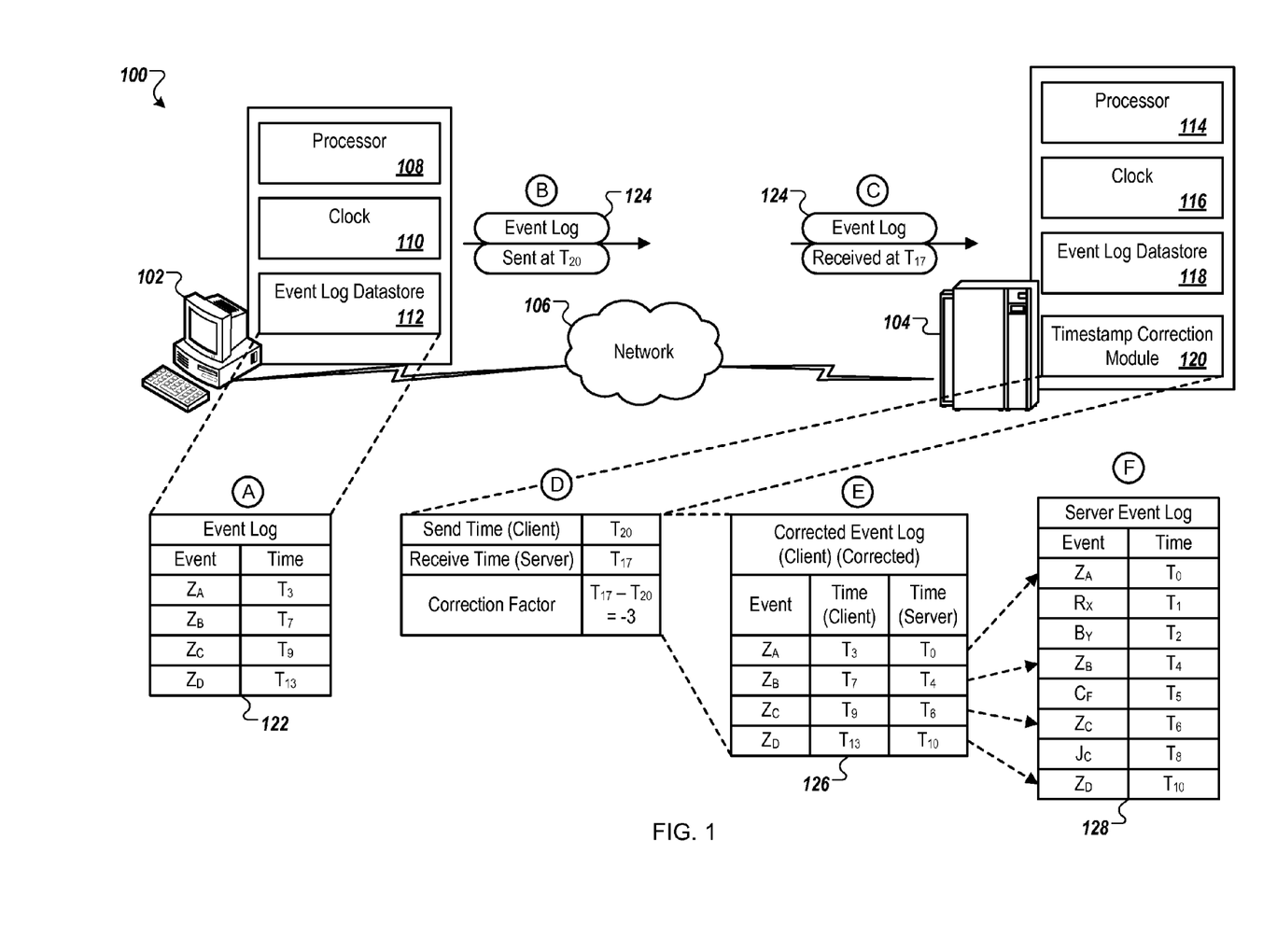
FIGS. 1 and 2 are diagrams of example systems that generate and correct client assigned timestamps.

FIG. 1 is a diagram of an example system 100 that generates and corrects client-assigned timestamps. FIG. 1 also illustrates an example flow of data, shown in states (A) to (F). States (A) to (F) may occur in the illustrated sequence, or may occur in a sequence that is different than the illustrated sequence.

In general, a client computer 102 may send a log of client-side events to a server computer 104 over one or more networks 106. The client-side events may be timestamped according to the client computer's 102 clock 110. The clock 110 may not be synchronized with the server computer's 104 clock 116. The server computer 104 may find a time offset between the client timestamp and the clock 116 and apply that offset to the client-side events in the received log.

More specifically, the client computer 102 may be a general purpose computer (e.g. a desktop, laptop, tablet computer, or mobile device with an operating system and user installed applications), a dedicated computing device (e.g. a web appliance, feature phone, smart power meter, e-book reader, or media player), another type of computing system, or a collection of any such devices.

The client computer 102 may include a processor 108, the clock 110, and an event log datastore 112. The processor 108 may execute code (e.g. firmware, operating system, and/or applications) that, among other features, generates records of client-side events. Client-side events include user inputs (e.g. clicks in a web browser), automated actions (e.g. data capture from sensors attached to the client computer 102), and internal client-side events in the client computer 102 (e.g. an anti-virus application scanning a malicious file).

The clock 110 may keep track of time in the client computer's 102 computing environment and may be used for timing tasks (e.g. scheduled execution of an application, monitoring a time window, timestamping a log entry). The clock 110 may track time in an absolute time format. One scheme for tracking absolute time is counting the number of seconds that have passed since a benchmark time. The event log datastore 112 may maintain a record of client-side events and associated timestamps from the clock 110 captured when the client-side event was created.

The server computer 104 may be general purpose computer, a dedicated computing device, a network device (e.g. a network switch, edge router, or telecommunication base-station), a peer of the client computer 102 (e.g. a node in a multi-computer cluster), another type of computing system, or a collection of any such devices. The server computer 104 may include a processor 114, a clock 116, an event log datastore 118, and a timestamp correction module 120.

The processor 114 may execute code that, among other features, stores client-side events from the client computer 102. The clock 116 may keep track of time in the server computer's 104 computing environment and may be used for timing tasks. The clock 116 may track time in an absolute format. The event log datastore 118 may maintain a record of received client-side events and associated timestamps, with the timestamps accurate according to the clock 116. The timestamp correction module may examine incoming message packets containing client-side event logs and correct any contained timestamps to corm with the clock 116.

In data state (A), the event log datastore 112 of the client computer 102 may maintain some or all client-side events in an event log 122. For example, an event log 122 may be maintained by the event log datastore 112 for each application of the client computer 102, for each user of the client computer 102, or according to other criteria. New client-side events may appended to the end of the event log, which may effectively ensure that the log is in chronological order, though other schemes are possible.

Each client-side event in the event log may have an event data-field, a time data-field, and other data-fields. The event data-field may, for example, uniquely identify each client-side event in the event log 122. The time data-field may record the state (e.g. time) of the clock 110 when the associated client-side event was created, monitored, or recorded, etc. Other data-fields not shown may include an anonymized user identifier, application identifier, event results (e.g. a search result that a user selects), and/or application specific data (e.g. a search session identifier used by a search engine).

In data state (B), the client computer 102 may transmit some or all of the event log 122 in one or more data packets 124 to the server computer 104. The data packet 124 may include a client-side transmission timestamp indicating the state of the clock 110 when the event log 122 is transmitted from the client computer 102. In some implementation, the client computer 102 may transmit each entry in the event log 122 as it is created. In some other implementations, the client computer 102 may store a group of client-side event records and transmit them in a bulk event log 122.

For example, a search engine interface (e.g. a web browser configured to display a search engine web page) may store client-side events related to user interactions with the search engine (e.g. queries submitted, search results displayed, search results selected by a user, refinements to submitted queries). The record of these client-side events may include information such as a search session identifier, anonymized user identifier, and click-selections of search results.

After a specified time, a specified number of records, at the end of a search session, or according to any appropriate criteria, the event log 122 may be transmitted by the client computer 102 at clock 110 time $T_{20}$. This transmission may include a ping request, which may be used to estimate latency between the client computer 102 and the server computer 104.

In data state (C), the server computer 104 may receive the data packets 124, and thus the enclosed event log 122 and client-side transmission timestamp. The reception by the server computer 104 may include determining, at the time of receipt, a receipt timestamp according to the server computer's 104 clock 116. A discrepancy between the transmission timestamp and receipt timestamp is possible. One reason for such a discrepancy may be a mismatch between the clock 110 and the clock 116. That is, at one particular point in time, the clock 110 and the clock 116 may indicate different times.

In some networked environments, synchronization of clocks may be difficult (e.g. over large geographic distances or for a moving client) or impossible (e.g. if a client must respect two different server clocks, when clock synchronization is not supported by the client or servers). Another source of the discrepancy may be network latency. That is, the travel time of the data packet 124 may be large compared to the granularity of the clock 110 and the clock 116, or the travel time over the link used by the data packet 124 may be highly variable or 'bursty.'

In data state (D) the timestamp correction module 120 may compare the receipt timestamp (e.g. server-time $T_{17}$) with the transmission timestamp (e.g. client-time $T_{20}$) to determine a time correction factor. The time correction factor may be the difference between the receipt timestamp and the transmission timestamp (e.g. 17−20, −3). In some implementations, other calculations may be used. For example, the timestamp correction module 120 may, in addition to finding the difference in timestamps, account for actual or estimated delays (e.g. network latency).

The timestamp correction module 120 may add a latency factor to the transmission timestamp or subtract the latency factor from the receipt timestamp. For example, for a transmission timestamp of $T_{125}$, a latency factor of 5, and a receipt timestamp of $T_{130}$, the timestamp correction module 120 may determine a time correction factor of 0 (125+5−130).

In data state (E), the timestamp correction module 120 may correct the received client-side event timestamps to create a corrected event log 126. For example, the timestamp correction module 120 may edit each record in the event log 122 to add a server-time data-field. The server-time data-field may be populated using the client-time data-field and the time correction factor from data state (D). For example, for an event $Z_4$, the corrected event log 126 may have a client-time data-field value of $T_3$, and the timestamp correction module 120 may have a time correction factor of −3. By adding −3 to the time $T_3$, a server-time value of $T_0$ may be found.

In data state (F), the timestamp correction module 120 may add the received client-side events of the corrected event log 126 to a server event log 128. The server event log may, for example, record some or all client-side events from some or all clients in communication with the server computer 104. The server event log 128 may be sorted or ordered according to the server time of each entry. In such an ordering, the client-side events of the client computer 102 may be separated by client-side events of other clients.

Figure 2:
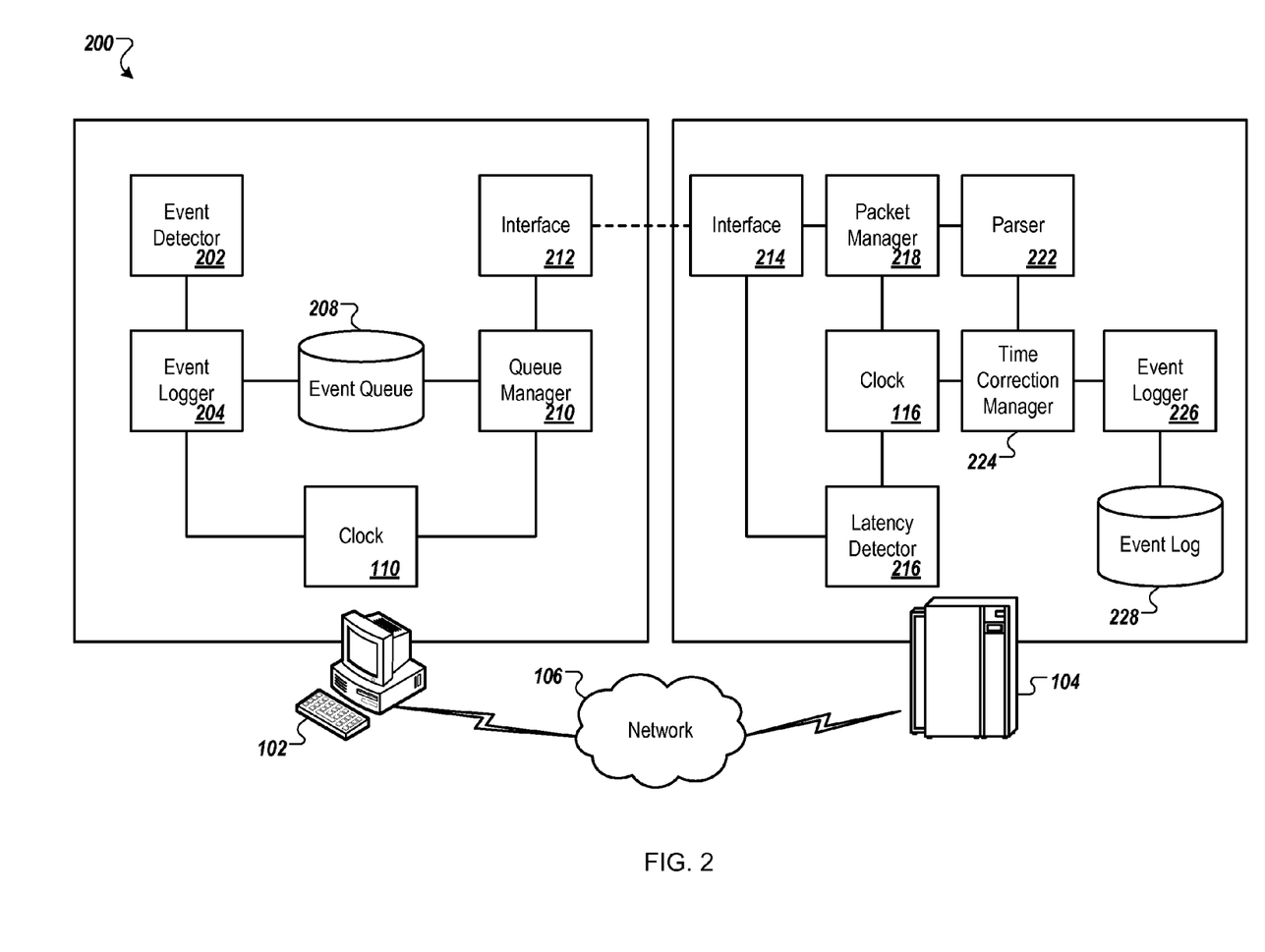

FIG. 2 is a diagram of an example system 200 that generates and corrects client assigned timestamps. The system 200 may include the client computer 102, the server computer 104, and the network 106 previously described in FIG. 1. Elements of the client computer 102 and of the server computer 104 described here may be executed and/or supported by some or all of the elements previously described. The client computer 102 may include an event detector 202, an event logger 204, the clock 110, an event queue 208, a queue manager 210, and an interface 212. The server computer 104 may include an interface 214, a latency detector 216, the clock 116, a packet manager 218, a parser 222, a time correction manager 224, an event logger 226, and an event log 228.

The event detector 202 may detect client-side events that are internal or external to the client computer. For example, a user clicking in a web browser displaying search results may be one such event that is detected. The event detector 202 may pass data of and/or a reference to the client-side event to the event logger 204. The event logger 204 may generate one or more records of the client-side event. For example, the event logger may create structured text (e.g. XML) or data (e.g. database rows) capturing information of the user click event. The event logger 204 may include a timestamp based on time data provided by the clock 110. The event queue 208 may receive the records of the client-side events from the event logger 204 and may store those records, temporarily or long-term.

The queue manager 210 may request the records of the client-side events from the event queue 208. The event queue 208 may operate in a first-in, first-out configuration, wherein the oldest records available are served to the queue manager 210 first. The queue manager may aggregate records of client-side events for transmission to the server computer 104. The queue manager 210 may construct the aggregation according to one or more criteria, such as a limited time window, an application session, a maximum number of records, etc. Included in this aggregation may be a transmission timestamp indicating the time, according to the clock 110 of the client computer 102, that the aggregation is transmitted.

The interface 212 of the client computer 102 may transmit the aggregation in one or more data packets over the networks 106 to the interface 214 of the server computer 104. This transmission may be formatted according to one or more communication standards such as the secure hypertext markup language (HTTPS), the file transfer protocol (FTP), and/or an application program interface (API) such as a representation state transfer (RESTful) API, etc.

The latency detector may detect and/or determine the latency of the communication between the interface 212 and the interface 214. To determine this latency, the latency detector may use information about ping requests from the client computer, a stored latency value associated with the client computer address or the data packet's anonymized user identifier, or other appropriate measures. The packet manager 218 may receive the data packet, latency information, and server time from the interface 214, the latency detector 216, and the clock 116, respectively. A receipt timestamp may be added to the data packet by the packet manager 218, and the data packet may be passed to the parser 222.

The parser 222 may parse the data packet into records of the client-side events. For example, unneeded network information may be identified and stripped, the records may be converted into another format, text may be parsed into n-grams, etc. Once the parsing is completed, the time correction manager 224 may receive the parsed records and determine a time correction factor for the received data packet. This correction factor may be applied to each record of the received data packet to create time information that is accurate for the server computer 104.

The event logger 226 may receive the records with the server computer 104 corrected time information, and store the records in the event log 228. Once stored, the records may be made available to other elements of the server computer 104 or other computer systems for use in data analysis tasks, billing and record keeping, etc.

Figure 3:
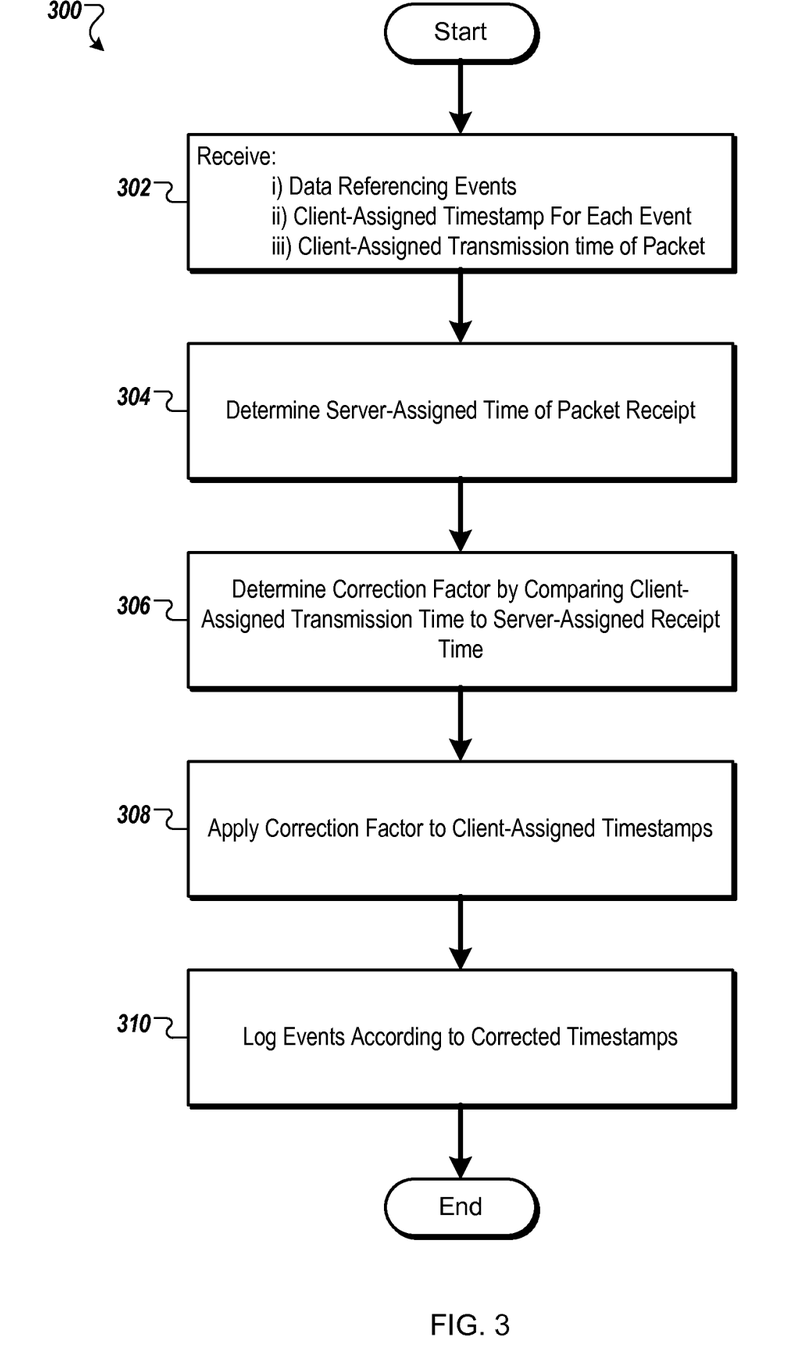
FIG. 3 is a flow chart illustrating an example process for adjusting a client assigned timestamp to match a server's clock.

FIG. 3 is a flow chart illustrating an example process 300 for adjusting a client assigned timestamp to match a server's clock. Briefly, the process 300 includes receiving time information and adjusting the time information to a different reference. The process 300 may be performed by, for example, the server computer 104 of the systems 100 and/or 200, but another system, or combination of systems, may also perform the process 300. While a particular number, type, and order of actions are described here, other numbers, orders, and types of actions may be possible within the process 300.

i) Data referencing one or more events, ii) data referencing a respective time that a client has assigned to each event, and iii) data referencing a transmission time that the client has assigned to the data packet is received (302). For example, data referencing one or more events may take the form of text, metadata, and other data that describes part of the state of an application or computer system when a predefined condition of the application or computer system is met.

The data referencing a respective time for each event may take the form of a date and time, a count of time since a landmark, or other appropriate format. Data referencing a transmission time may take the form of similarly formatted data. In some implementations, the only data received from the client may a reference (e.g. pointer, universal resource locater (URL), etc) to a datastore location that contains this information. For example, in some distributed parallel computing environments, it may be more efficient to pass such a reference as opposed to the data itself.

A server-assigned time of packet receipt is determined (304). For example, a clock associated with the receiving server may be polled when packet receipt occurs. In some implementations, the clock may be external to the server and coupled communicably to the server. This may be the case, for example, if a clock service is provided to a collection of servers, and all the servers are configured to work with the same time reference for purposes of interoperability and data exchange.

A correction factor is determined by comparing client-assigned transmission time to server-assigned receipt time (306). For example, the difference between the client-assigned transmission time and the server-assigned receipt time may be found and used as the basis for a time correction factor. This difference may be modified to account for factors other than just asynchronism of the client and server system. For example, network lag or processing lag (delay due to generating or parsing, for example) may also be accounted for.

In some implementations, the correction factor satisfying the equation SERVEREVENTTIME=CLIENTEVENTTIME−(CLIENT-PINGTIME−SERVERPINGTIME), where SERVEREVENTTIME represents the corrected time for the particular event, CLIENTEVENTTIME represents the time that the client has assigned to the particular event, CLIENTPINGTIME represents the transmission time that the client has assigned to the data packet, and SERVERPINGTIME represents the receipt time assigned to the data packet by the one or more servers. A latency factor associated with communicating the data packet is determined and applying the time correction factor to generate a respective corrected time for each event includes applying the latency factor. In the equation above, (CLIENTPINGTIME−SERVERPINGTIME) may modified to be ((CLIENTPINGTIME−SERVERPINGTIME+LAGTIME), where LAGTIME represents some or all estimated lag in communication between the client and server.

The correction factor is applied to client-assigned timestamps to generate a corrected time for each event (308). For example, for every timestamp in the receive data packet, except for the transmission timestamp, the correction factor may be applied to translate the timestamp from the reference of the client to the reference of the server. Events are logged according to the corrected timestamps (310). For example, the events may be merged into an existing event log on the server or accessible by the server. These events may be used for any number of future tasks by the server or another computer device. In some implementations, future incoming events may be processed by the process 300 and stored to the same repository, subject to privacy safeguards and limitations.

Figure 4:
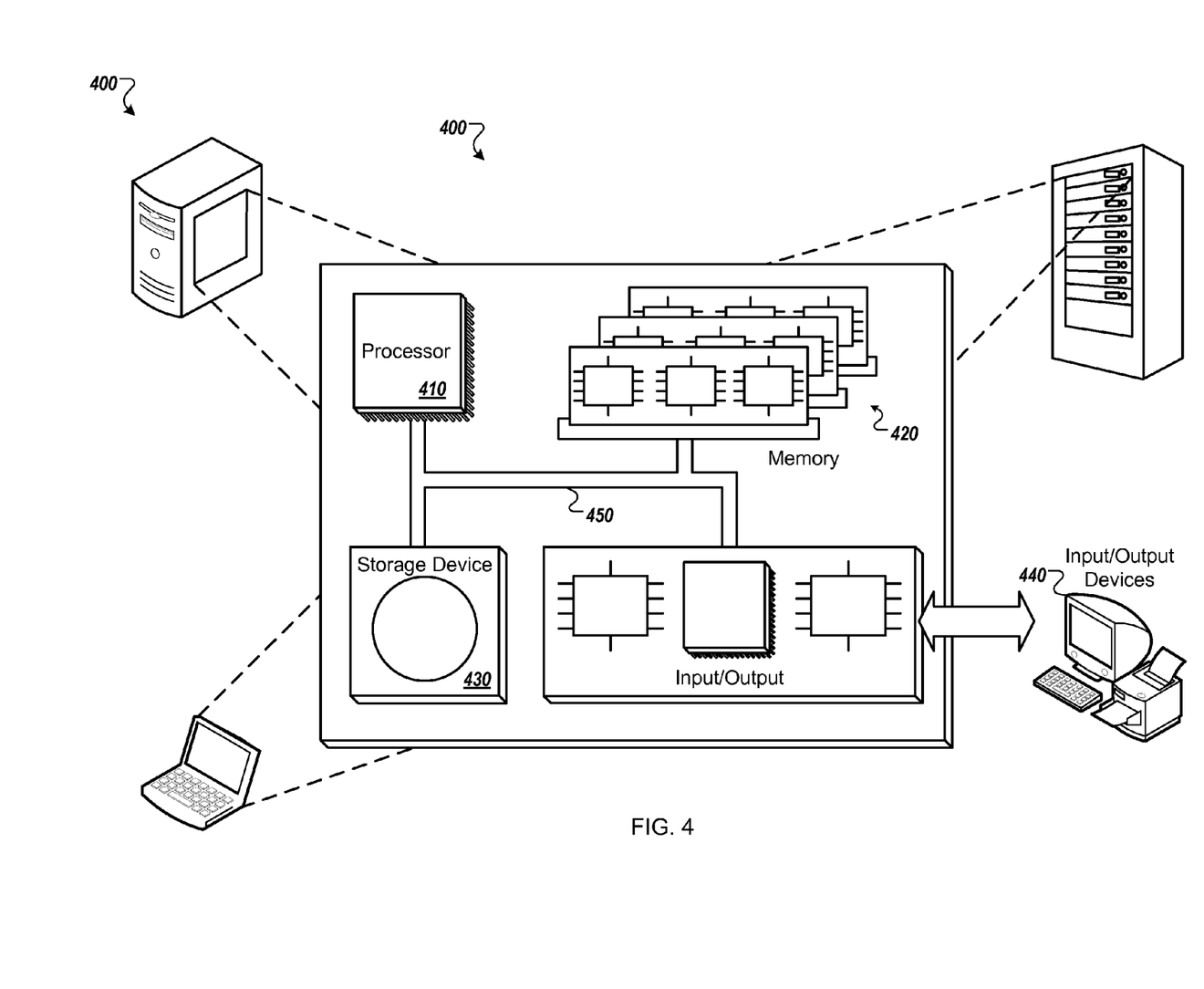
FIG. 4 is a schematic diagram that shows an example of a computing system that may be used in connection with computer-implemented methods and systems described in this document.

FIG. 4 is a schematic diagram that shows an example of a computing system 400. The computing system 400 may be used for some or all of the operations described previously, according to some implementations. The computing system 400 includes a processor 410, a memory 420, a storage device 430, and an input/output device 440. Each of the processor 410, the memory 420, the storage device 430, and the input/output device 440 are interconnected using a system bus 450. The processor 410 is capable of processing instructions for execution within the computing system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the computing system 400. In some implementations, the memory 420 is a computer-readable medium. In some implementations, the memory 420 is a volatile memory unit. In some implementations, the memory 420 is a non-volatile memory unit.

The storage device 430 is capable of providing mass storage for the computing system 400. In some implementations, the storage device 430 is a computer-readable medium. In various different implementations, the storage device 430 may be a floppy disk device, a hard disk device, an optical disk device, or a tape device.

The input/output device 440 provides input/output operations for the computing system 400. In some implementations, the input/output device 440 includes a keyboard and/or pointing device. In some implementations, the input/output device 440 includes a display unit for displaying graphical user interfaces.

Some features described may be implemented in digital electronic circuitry, or in computer hardware, firmware, software, or in combinations of them. The apparatus may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory may be supplemented by, or incorporated in, ASICs (application-specific integrated circuits).

To provide for interaction with a user, some features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

Some features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN (local area network), a WAN (wide area network), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method comprising:
receiving, by one or more servers, a data packet that includes:
   data referencing one or more client-side click events,
   data referencing a respective time that each client-side click event occurred, as indicated by a client-side clock, and
   data referencing a transmission time, as indicated by the client-side clock, that is assigned to the data packet;
determining, by the one or more servers, a receipt time of the data packet as indicated by a server clock associated with one or more of the servers;
estimating, by the one or more servers, an amount of time by which the client-side clock and the server clock are out of synchronization based at least on (i) the transmission time, as indicated by the client-side clock, that is assigned to the data packet, and (ii) the receipt time of the data packet, as indicated by the server clock;
for one or more client-side click events referenced by data included in the data packet, generating, by the one or more servers, a server clock time for the client-side click event based at least on (i) the estimate of the amount of time by which the client-side clock and the server clock are out of synchronization, and (ii) the time that the client-side click event occurred, as indicated by the client-side clock; and
for one or more client-side click events referenced by data included in the data packet, logging, by the one or more servers, the client-side click event in an event log according to the server clock time for the client-side click event.

2. The method of claim 1, comprising:
determining a latency factor associated with communicating the data packet,
wherein the server clock time is further based on (iii) the latency factor.

3. The method of claim 1, wherein a server clock time for a particular client side click event satisfies:

$$SERVEREVENTTIME = CLIENTEVENTTIME - (CLIENTPINGTIME - SERVERPINGTIME),$$

wherein:
SERVEREVENTTIME represents the server clock time generated for the particular event,
CLIENTEVENTTIME represents the time that the particular event occurred, as indicated by the client-side clock,
CLIENTPINGTIME represents the transmission time, as indicated by the client-side clock, that is assigned to the data packet, and
SERVERPINGTIME represents the receipt time of the data packet, as indicated by the server clock.

4. The method of claim 1, wherein the data packet comprises a ping request.

5. The method of claim 1, wherein the corrected time for a particular event is determined based on values for SERVEREVENTTIME, CLIENTEVENTTIME, CLIENTPINGTIME value, and SERVERPINGTIME, and
wherein:
SERVEREVENTTIME represents the server clock time generated for the particular event,
CLIENTEVENTTIME represents the time that the particular event occurred, as indicated by the client-side clock,
CLIENTPINGTIME represents the transmission time, as indicated by the client-side clock, that is assigned to the data packet, and
SERVERPINGTIME represents the receipt time of the data packet as indicated by the server clock.

6. A system comprising:
one or more computers and one or more storage devices storing instructions that are operable, when executed by the one or more computers, to cause the one or more computers to perform operations comprising:
receiving a data packet that includes:
   data referencing one or more client-side click events,
   data referencing a respective time that each client-side click event occurred, as indicated by a client-side clock, and
   data referencing a transmission time, as indicated by the client-side clock, that is assigned to the data packet;
determining a receipt time of the data packet as indicated by a server clock associated with one or more servers;
estimating an amount of time by which the client-side clock and the server clock are out of synchronization based at least on (i) the transmission time, as indicated by the client-side clock, that is assigned to the data packet, and (ii) the receipt time of the data packet, as indicated by the server clock;
for one or more client-side click events referenced by data included in the data packet, generating a server clock time for the client-side click event based at least on (i) the estimate of the amount of time by which the client-side clock and the server clock are out of synchronization, and (ii) the time that the client-side click event occurred, as indicated by the client-side clock; and
for one or more client-side click events referenced by data included in the data packet, logging the client-side click event in an event log according to the server clock time for the client-side click event.

7. The system of claim 6, wherein the operations comprise:
determining a latency factor associated with communicating the data packet,
wherein the server clock time is further based on (iii) the latency factor.

8. The system of claim 6, wherein a server clock time for a particular client side click event satisfies:

$$SERVEREVENTTIME = CLIENTEVENTTIME - (CLIENTPINGTIME - SERVERPINGTIME),$$

wherein:
SERVEREVENTTIME represents the server clock time generated for the particular event,
CLIENTEVENTTIME represents the time that the particular event occurred, as indicated by the client-side clock,
CLIENTPINGTIME represents the transmission time, as indicated by the client-side clock, that is assigned to the data packet, and
SERVERPINGTIME represents the receipt time of the data packet, as indicated by the server clock.

9. The system of claim 6, wherein the data packet comprises a ping request.

10. The system of claim 6, wherein the corrected time for a particular event is determined based on values for SERVEREVENTTIME, CLIENTEVENTTIME, CLIENTPINGTIME value, and SERVERPINGTIME, and
wherein:
SERVEREVENTTIME represents the server clock time generated for the particular event,
CLIENTEVENTTIME represents the time that the particular event occurred, as indicated by the client-side clock,
CLIENTPINGTIME represents the transmission time, as indicated by the client-side clock, that is assigned to the data packet, and
SERVERPINGTIME represents the receipt time of the data packet as indicated by the server clock.

11. A computer-readable storage device storing software comprising instructions executable by one or more computers which, upon such execution, cause the one or more computers to perform operations comprising:
receiving a data packet that includes:
data referencing one or more client-side click events,
data referencing a respective time that each client-side click event occurred, as indicated by a client-side clock, and
data referencing a transmission time, as indicated by the client-side clock, that is assigned to the data packet;
determining a receipt time of the data packet as indicated by a server clock associated with one or more servers;
estimating an amount of time by which the client-side clock and the server clock are out of synchronization based at least on (i) the transmission time, as indicated by the client-side clock, that is assigned to the data packet, and (ii) the receipt time of the data packet, as indicated by the server clock;
for one or more client-side click events referenced by data included in the data packet, generating a server clock time for the client-side click event based at least on (i) the estimate of the amount of time by which the client-side clock and the server clock are out of synchronization, and (ii) the time that the client-side click event occurred, as indicated by the client-side clock; and
for one or more client-side click events referenced by data included in the data packet, logging the client-side click event in an event log according to the server clock time for the client-side click event.

12. The device of claim 11, wherein the operations comprise:
determining a latency factor associated with communicating the data packet,
wherein the server clock time is further based on (iii) the latency factor.

13. The device of claim 11, wherein a server clock time for a particular client side click event satisfies:

$$SERVEREVENTTIME = CLIENTEVENTTIME - (CLIENTPINGTIME - SERVERPINGTIME),$$

wherein:
SERVEREVENTTIME represents the server clock time generated for the particular event,
CLIENTEVENTTIME represents the time that the particular event occurred, as indicated by the client-side clock,
CLIENTPINGTIME represents the transmission time, as indicated by the client-side clock, that is assigned to the data packet, and
SERVERPINGTIME represents the receipt time of the data packet, as indicated by the server clock.

14. The device of claim 11, wherein the data packet comprises a ping request.

15. The device of claim 11, wherein the corrected time for a particular event is determined based on values for SERVEREVENTTIME, CLIENTEVENTTIME, CLIENTPINGTIME value, and SERVERPINGTIME, and
wherein:
SERVEREVENTTIME represents the server clock time generated for the particular event,
CLIENTEVENTTIME represents the time that the particular event occurred, as indicated by the client-side clock,
CLIENTPINGTIME represents the transmission time, as indicated by the client-side clock, that is assigned to the data packet, and
SERVERPINGTIME represents the receipt time of the data packet as indicated by the server clock.

* * * * *